Patented May 9, 1950

2,507,088

UNITED STATES PATENT OFFICE 2,507,088

SULFOXIDATION PROCESS

Harris Walton Bradley, Wilmington, Del., assignor to E. I. du Pont de Nemours & Company, Wilmington, Del., a corporation of Delaware No Drawing. Application January 8, 1948, Serial No. 1,263

3 Claims. (Cl. 260—513)

This invention relates to the preparation of aliphatic sulfonic acids and more particularly to the preparation of aliphatic sulfonic acids from saturated hydrocarbons by reaction with sulfur dioxide and oxygen.

Aliphatic sulfonic acids have been prepared from saturated aliphatic hydrocarbons by the reaction therewith of sulfur dioxide and oxygen employing ultraviolet irradiation with or without acid anhydrides or acid chlorides or employing hydrogen peroxide with acid chlorides or acid anhydrides. See particularly German Patent 735,096.

This invention has as an object the preparation of aliphatic sulfonic acids from saturated aliphatic hydrocarbons by reaction with sulfur dioxide and oxygen. These objects are accomplished by the following invention wherein a saturated aliphatic hydrocarbon is reacted with sulfur dioxide and oxygen employing, as the catalyst therefor, a $Pb^{IV}$, i. e., a plumbic, salt of a saturated aliphatic carboxylic acid of two to four carbons, e. g., lead tetraacetate. With this catalyst ultraviolet light is unnecessary.

The following examples in which parts are by weight are illustrative of the invention.

Example I

Into a two-liter round-bottom borosilicate glass flask fitted with a thermometer, an agitator, and gas inlet and outlet tubes were placed 200 parts of cetane and 4 parts of lead tetraacetate. The mixture was heated in a water bath to 60° C., and a gaseous mixture of 186 parts of sulfur dioxide and 42 parts of oxygen was passed into the agitated mixture over a period of two hours. The charge gained 21 parts in weight during the gassing, and some brown precipitate of lead dioxide was formed. The gassed material was made just alkaline to phenolphthalein indicator with 45 parts of 30% sodium hydroxide, and the solid material was removed by filtration. The resulting emulsion was separated into an oil and an aqueous phase by dilution with about 300 parts of water and about 40 parts of ethanol. The oil layer comprised 164 parts of unreacted cetane. The aqueous alcohol layer, after extraction with hexane and boiling, was adjusted to a weight of 500 parts with water. The light amber-colored solution showed by analysis 8.2% sodium aliphatic sulfonate (molecular weight 337). This is a yield of 41 parts.

Example II

Into a two-liter round-bottom borosilicate glass flask fitted with a thermometer, an agitator, and gas inlet and outlet tubes were placed 100 g. of cetane, 3 cc. of acetic anhydride and 2 g. of lead tetraacetate. The agitated mixture was heated in a water bath to 40° C. and a gaseous mixture of 16 g. oxygen and 72 g. sulfur dioxide was bubbled through the liquid over a two hour period. At this time a small pool of brown oil had formed in the flask and the charge had increased in weight by 9 g. About 55 cc. of water was then added, the temperature raised to 60° C., and gassing continued for 3 hours with a mixture of 30 g. oxygen and 120 g. sulfur dioxide during which time the mixture showed a weight gain of 12 g. The charge was filtered to remove the white precipitate and the oil and aqueous layers separated in a separatory funnel. The addition of 40 cc. water and 10 cc. ethyl alcohol to the aqueous layer resulted in an additional small oil layer which was separated. The aqueous layer was neutralized with 49 g. of 30% sodium hydroxide, and the addition of 20 cc. more ethyl alcohol resulted in a further trace of oil separation. A total of 69 g. of unreacted cetane was recovered. The aqueous solution weighed 187 g. and showed by analysis 18.2% sodium cetane sulfonate (molecular weight 337), which is a yield of 34 g.

Example III

Using the same equipment as in Example II, a mixture of 254 g. of cetane, 6 g. of propane sulfonyl chloride, and 5 g. of lead tetraacetate was gassed at 40° C. for two hours with a mixture of 89 g. of sulfur dioxide and 56 g. of oxygen. The charge showed a weight gain of 19 g. After the addition of 95 cc. of water the temperature was raised to 60° C. and gassing continued for 3 hours with a mixture of 135 g. of sulfur dioxide and 25 g. of oxygen. The charge gained 13 g. during this stage. The mixture was filtered to remove the catalyst sludge, and after the addition of 10 cc. of ethyl alcohol a layer of unreacted cetane weighing 226 g. was separated. The aqueous layer was neutralized with sodium hydroxide solution, extracted three times with 100 cc. portions of hexane, boiled vigorously to remove the organic solvents, and made up to 1000 g. with water. This solution showed by analysis 4.0% sodium cetane sulfonate (molecular weight 337), which is a yield of 40 g.

Example IV

By the same procedure as in Example III, a mixture of 259 g. of cetane, 5 g. of cetane sulfonyl chloride, and 5 g. of lead tetraacetate was gassed in the first stage at 40° C. with a mixture of 77 g. of sulfur dioxide and 20 g. of oxygen. The weight gain on gassing was 21 g. After the addition of 95 cc. of water gassing was continued at 60° C. with a mixture of 114 g. of sulfur dioxide and 24 g. of oxygen. The weight gain in this stage was 8 g. An unreacted cetane layer weighing 232 g. was separated. The aqueous layer, after neutralization with sodium hydroxide, extraction with hexane, and boiling, was adjusted to 1000 g. and showed by analysis 4.1% sodium cetane sulfonate. This is a yield of 41 g.

The reaction may be conducted using other catalysts, e. g., alkyl hydroperoxides, metal alkyls, inorganic azo compounds, metal ketyls, vicinal diketones such as diacetyl, the corresponding acyloins such as benzoin, hexaarylethanes such as hexaphenyl ethane. This is illustrated in the following examples.

*Example V*

By the same procedure as in Example I, 200 parts of a highly paraffinic hydrocarbon fraction boiling between 265° C. and 305° C., free from unsaturated constituents, and having a specific gravity of 0.801 at 15.5° C. was gassed with 257 parts of sulfur dioxide and 63 parts of oxygen in the presence of 4 parts of tertiary butyl hydroperoxide (assay 65.2%). Neutralization of the gassed mixture required 10 parts of 30% sodium hydroxide. The separated oil layer consisted of 197 parts of unreacted hydrocarbon. The aqueous layer after extraction, boiling, and adjusting to 500 parts foamed readily and showed by analysis 0.26% sodium aliphatic sulfonate (molecular weight 368), which is a yield of 1.3 parts.

*Example VI*

Two hundred parts of cetane was gassed at 60° C. over a two hour period with a mixture of 261 parts of sulfur dioxide and 55 parts of oxygen. During the first 75 minutes of this time 2 parts of diacetyl was added dropwise to the reaction flask. The reaction flask was exposed to the radiation of a 150-watt projector lamp. The gassed mixture was neutralized with 9 parts of 30% sodium hydroxide. From the resulting emulsion 196 parts of unreacted cetane was recovered. The aqueous solution, adjusted to 500 parts after the usual hexane extraction showed by analysis 0.4% sodium aliphatic sulfonate. This is a yield of 1.0 part.

*Example VII*

Using the same equipment as in the above examples a mixture of 200 parts of cetane and 4 parts of tertiary butyl hydroperoxide was gassed at 60° C. with a gaseous mixture of 238 parts of sulfur dioxide and 66 parts of oxygen over a period of two hours. The reaction flask was exposed to the light of a 150-watt projector lamp. Although the gain in weight on gassing was negligible, 12 parts of 30% sodium hydroxide was required for neutralization. Filtration was unnecessary. The neutralized mixture yielded 196.5 parts of unreacted oil and 500 parts of an aqueous solution that showed by analysis 0.28% sodium aliphatic sulfonate, which is a yield of 1.4 parts.

*Example VIII*

Into a two-liter round-bottom borosilicate flask fitted with a thermometer, an agitator, and gas inlet and outlet tubes were placed 200 g. of cetane and 4 g. of lead tetrapropionate. The mixture was heated in a water bath to 60° C., and a gaseous mixture of 202 g. of sulfur dioxide and 56 g. of oxygen was passed into the agitated mixture over a period of two hours. The charge showed a weight gain of 7 g. on gassing. The resulting lead dioxide and the unreacted catalyst were removed by filtration and the filtrate, after dilution with 400 g. water, was made just alkaline to phenolphthalein indicator with 7 g. of 30% sodium hydroxide solution. The resulting emulsion was separated into an oil and an aqueous phase by the addition of about 35 g. of ethanol. The oil layer comprised 175 g. of unreacted cetane. The aqueous alcohol layer, after extraction with hexane and boiling as in the preceding examples, was adjusted to a weight of 500 g. with water. This solution showed by analysis 1% sodium aliphatic sulfonate (molecular weight 337). This is a yield of 5 g., i. e. about 2%. Thus lead tetrapropionate functions as a catalyst, but is definitely less effective than lead tetraacetate which is also definitely more effective than the other catalysts herein disclosed. Lead tetraacetate is therefore the preferred catalyst in the procedure of the present application.

It is to be noted that with the use of ultraviolet radiation as catalyst, essentially 100% yield of sulfonate from hydrocarbons is possible by recycling unused reactants in a cyclic process. Consequently, operation on a continuous and recycled process using the above catalysts is quite feasible even at relatively low batchwise conversions.

In the present invention the energy necessary for the activation of the system for direct sulfoxidation is provided by $Pb^{IV}$, i. e., tetralead, salts of saturated aliphatic monocarboxylic acids, e. g., lead tetraacetate.

In the sulfur dioxide-oxygen sulfonylation there is much variation in catalytic activity. Temperature and light are usually critical factors. Thus potassium azodisulfonate decomposes at 0° C. and is active as a catalyst at this temperature. Likewise, tetraethyllead is a much less active catalyst at 60° C. than is dimethylzinc because much higher temperatures than 60° C. are required to dissociate appreciably the tetraethyl lead molecule. A higher temperature, such as 80° C., is favorable for a more stable catalyst while a lower temperature, such as 0° C., is more favorable for a very volatile or for a highly active catalyst, e. g., potassium azodisulfonate. The process conditions may or may not permit the use of actinic light to assist the catalytic activity and may or may not involve the use of water in the presence of the reactants. Catalysts active in the process which may be used are illustrated by, but not restricted to, the following examples: metal alkyls, e. g., dimethylzinc and lead tetraethyllead; aliphatic diazo compounds, e. g., diazoacetic ester; inorganic azo compounds, e. g., potassium azodisulfonate; metallic ketyls, e. g., the sodium and potassium derivatives of benzophenone and fluorenone; N-nitroacetanilide; and hexaarylethanes, e. g., hexaphenylethane.

The catalysts vary somewhat in their effectiveness and are employed in concentrations from 0.03% to 5% based on the hydrocarbon. The preferred catalyst is lead tetraacetate, which results in an increased reaction rate to form the aliphatic sulfonic acid.

The monosulfonates of the hydrocarbons are usually more valuable than the di- or polysulfonates. It is preferred to operate the process to produce a large proportion of mono-sulfonate. This is accomplished by reacting only a portion of the hydrocarbon, usually 10% to 50% and then working up the product. The unreacted hydrocarbon may then be recycled to the reaction.

Any saturated hydrocarbon aliphatic in character, i.e., any saturated aliphatic or cycloaliphatic hydrocarbon, may be employed in this sulfoxidation reaction to form sulfonic acids. This category including saturated aliphatic straight and branched-chain hydrocarbons, e.g., pentane, cetane, and saturated white oils; and saturated alicyclic hydrocarbons, e.g., cyclohexane, menthane, and naphthenic oils.

The relative weight ratio of the sulfur dioxide to oxygen may vary between 2:1 to 6:1 but the preferred ratio is four parts of sulfur dioxide to 1 part of oxygen. Air may be used instead of oxygen. The temperature may vary between 20° C. and 80° C. Below 20° the reaction is too slow to be practical. Above 80° there may be decomposition not excluding the possibility of explosion. Moderate pressure above atmospheric may be used to increase the rate of reaction since it increases the solubility of the gases in the liquid phase.

This invention has a distinct value in the art in that it permits the sulfonation of saturated hydrocarbons in the absence of ultraviolet light. Heretofore it has been necessary to provide special quartz equipment which would permit irradiation of the reaction mass with ultraviolet light. Furthermore, great expense has been involved in providing the necessary ultraviolet lamps and the power for operating them.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the sulfoxidation of a saturated hydrocarbon aliphatic in character by means of sulfur dioxide and oxygen, the improvement wherein the sulfoxidation is conducted in the presence of a $Pb^{IV}$ salt of a saturated aliphatic monocarboxylic acid of two to four carbons.

2. Process of claim 1 wherein the initiator is lead tetraacetate.

3. Process of claim 2 wherein the hydrocarbon is cetane.

HARRIS WALTON BRADLEY.

REFERENCES CITED

The following references are of record in the file of this patent:

UNITED STATES PATENTS

| Number | Name | Date |
|---|---|---|
| 2,171,117 | Schrauth et al. | Aug. 29, 1939 |
| 2,302,228 | Karasch | Nov. 17, 1942 |
| 2,346,568 | Fox | Apr. 11, 1944 |
| 2,374,193 | Grubb | Apr. 24, 1945 |

FOREIGN PATENTS

| Number | Country | Date |
|---|---|---|
| 735,096 | Germany | Apr. 1, 1943 |